United States Patent [19]

den Hollander et al.

[11] Patent Number: 4,701,793

[45] Date of Patent: Oct. 20, 1987

[54] TELEVISION DISPLAY SYSTEM WITH FLICKER REDUCTION PROCESSOR

[75] Inventors: Willem den Hollander, Schlieren; Giovanni M. Leonardi, Zurich, both of Switzerland

[73] Assignee: RCA Corporation, Princeton, N.J.

[21] Appl. No.: 857,375

[22] Filed: Apr. 30, 1986

[30] Foreign Application Priority Data

Apr. 11, 1986 [GB] United Kingdom .................. 8608876

[51] Int. Cl.[4] .......................... H04N 5/02; H04N 5/04; H04N 5/21
[52] U.S. Cl. .................................. 358/140; 358/152; 358/166; 358/167
[58] Field of Search ............... 358/140, 166, 167, 152, 358/160

[56] References Cited

U.S. PATENT DOCUMENTS

| | | | |
|---|---|---|---|
| 2,681,383 | 6/1954 | Leo ........................................ | 358/152 |
| 4,322,750 | 3/1982 | Lord et al. ............................ | 358/140 |
| 4,426,661 | 1/1984 | Okada et al. ......................... | 358/140 |
| 4,603,351 | 7/1986 | Vreeswijk et al. .................. | 358/140 |
| 4,604,651 | 8/1986 | Frencken et al. .................... | 358/140 |
| 4,651,209 | 3/1987 | Okada et al. ......................... | 358/148 X |
| 4,658,293 | 4/1987 | Arai et al. ............................ | 358/140 |

*Primary Examiner*—James J. Groody
*Assistant Examiner*—Victor R. Kostak
*Attorney, Agent, or Firm*—Paul J. Rasmussen; Peter M. Emanuel; Richard G. Coalter

[57] ABSTRACT

The field rate of a video input signal is doubled by storing each field in a memory and recovering each stored fields twice so as to repeat each field and thus reduce flicker. To ensure that even fields overlay even fields, odd fields overly odd fields and that all pairs of even and odd fields are interlaced, a timing unit provides a double field rate control signal to the memory having a waveform that repeats on a two-field basis and supplies a double field rate vertical synchronizing signal to a display having a waveform that repeats on a four-field basis. Registration of images is enhanced further by means of a vertical scan generator having a constant retrace time, a fixed retrace level and employing DC coupling thereby avoiding raster shift which otherwise could occur as a result of the use of non-equidistant vertical synchronizing pulses.

13 Claims, 11 Drawing Figures

Fig. 8

TELEVISION DISPLAY SYSTEM WITH FLICKER REDUCTION PROCESSOR

FIELD OF THE INVENTION

This invention relates to television display systems and particularly to systems employing field memories arranged to increase the field rate of displayed images for reducing the visibility of flicker.

BACKGROUND OF THE INVENTION

The threshold of perception of field flicker in a television display system is a function of the flicker frequency and the brightness of the display. Over the years displays have increased in brightness to the point where flicker is noticeable even in relatively high field rate systems (e.g., the NTSC 60 Hz system) and clearly objectionable in lower field rate systems (e.g., the PAL 50 Hz system). A solution to this problem is to double the field rate of displayed images as described, for example, by Lord et al. in U.S. Pat. No. 4,322,750 entitled TELEVISION DISPLAY SYSTEM which issued Mar. 30, 1982. In an example of the Lord et al. system, a video input signal is stored in a field memory. Each stored field is recovered or "read" twice from the memory and displayed on a display scanned at double the line rate and double the field rate of the incoming video signal thereby doubling the flicker frequency of displayed images and thus reducing the visibility of flicker.

Lord et al. recognize that doubling the field rate of an interlaced signal by repeating fields results in a non-standard field sequence of even-even-odd-odd (E-E-O-O). In order to preserve the vertical resolution of displayed images it is important that even fields overly even fields, that odd fields overlay odd fields and that even and odd fields be interlaced when the double field rate signal is displayed. Lord et al. propose that a E-E-O-O display interlace pattern may be implemented by "perturbing" (i.e., offsetting) the display horizontal scan waveform by one-half line every other field. As an alternative, Lord et al. suggest that the vertical scan waveform may be "perturbed". The specific waveform proposed by Lord et al. for "perturbing" the horizontal scan signal requires half-line scans at the end of first and third fields of a four-field sequence with the half-line scans having different reset levels. Specifically, the horizontal scan is reset to its starting point during the last half-line of the first field of the sequence and is reset to its midpoint level for the last half line of the third field of the sequence. A scanning pattern having different reset levels is difficult to implement and particularly so in a high field rate system.

Lord et al. do not disclose any specific means for "perturbing" the horizontal or vertical scan waveforms. It is known generally, however, that display interlace patterns may be altered by adding an offset current to the yoke of a kinescope as described, for example, by Loe in U.S. Pat. No. 2,681,383 which issued June 15, 1954. The use of deflection offset currents for interlace control has certain disadvantages, however, particularly as applied to a field repeating flicker reduction systems. In flicker reduction systems the field rate is relatively high (e.g., 100 Hz for PAL or 120 Hz for NTSC). This high field rate places more critical requirements on the deflection circuit components and complicates the design of the offset current source. Special compensation circuits for the offset signal may be required to minimize interlace errors due to high voltage variations and to avoid line-pairing, miss-convergence, pin cushion problems and other undesirable visual artifacts.

SUMMARY OF THE INVENTION

The present invention is directed to meeting the need for a flicker reduced display system of the field repeating type which avoids the need (and complexity) of multiple scan reset levels and also avoids the aforementioned problems associated with the use of offset current in the display deflection system.

A television display system embodying the invention includes input means for receiving an interlaced video input signal having a given field rate. A memory means, coupled to the input means, has a write cycle for storing a field of the input signal and first and second read cycles for recovering a previously stored field two times during one write cycle to provide a video output signal of double said given field rate for display on a display means. A timing means, responsive to the video input signal, supplies a read control signal to the memory means having a pulse waveform that repeats on a two-field basis and supplies a vertical synchronizing signal to the display means having a pulse waveform that repeats on a four-field basis. The pulse waveforms have a nominal frequency of double the given field rate and have respective two-field and four-field pulse patterns selected to provide a displayed image on said display means in which even fields overlay even fields, odd fields overlay odd fields and in which even and odd field pairs are interlaced.

BRIEF DESCRIPTION OF THE DRAWING

The invention is illustrated in the accompanying drawing wherein like elements are denoted by like reference designators and in which.

DETAILED DESCRIPTION

Figure 1:
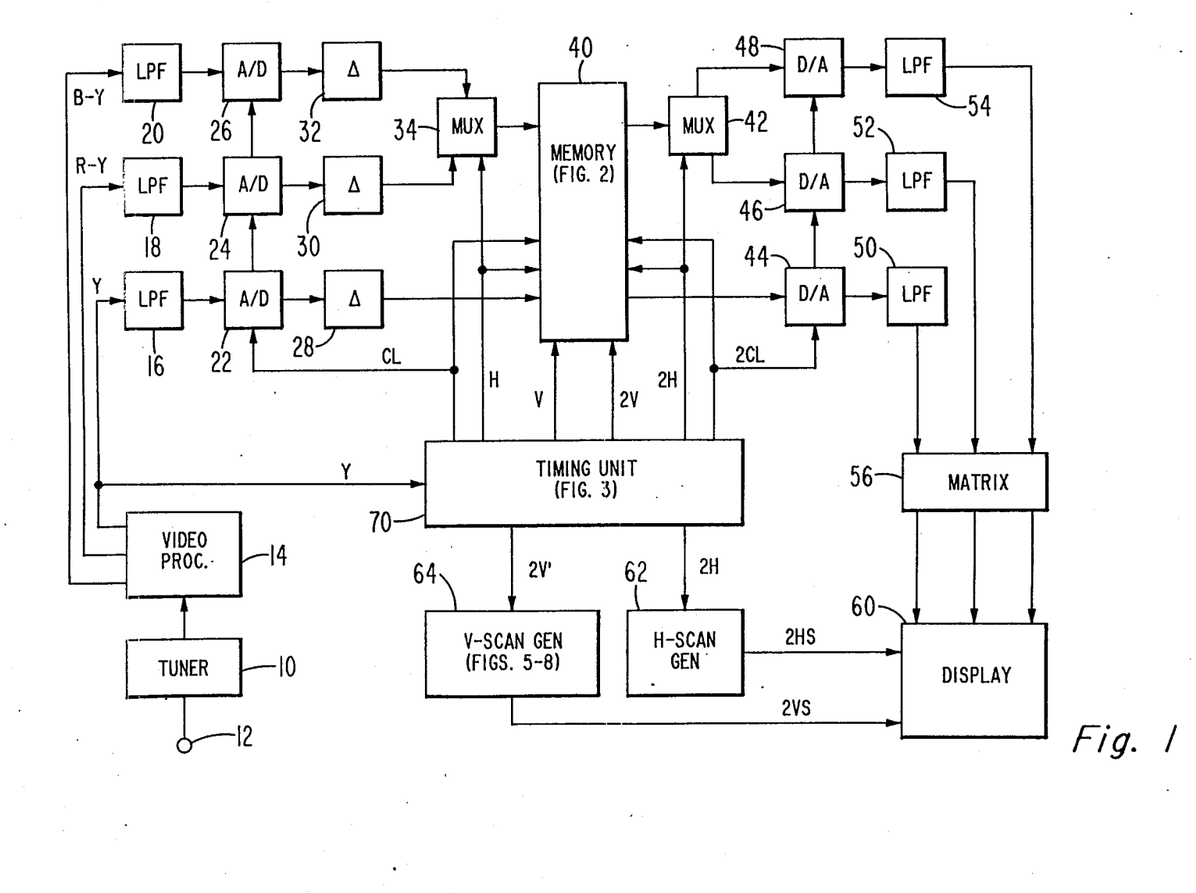
FIG. 1 is a block diagram of a television receiver embodying the invention.

The receiver of FIG. 1 includes a tuner 10 having an input terminal 12 for connection to an antenna or other source of video input signal and having an output for supplying a baseband video output signal to a video processing unit 14. For purposes of illustration it will be assumed that the video signal is of the PAL standard. It will be appreciated, however, that the principles of the invention apply also to other standard interlaced video signal formats. Video processor 14 includes a PAL decoder that converts the input signal to Y, R-Y and B-Y component form. The signal could be processed, if desired, in R, G, B component form but R, G, B components each have full video bandwidth while the color difference signals (R-Y, B-Y) have a lower bandwidth.

Accordingly, a field store for color difference signals can be realized with fewer memory elements than would be the case if processing were done using R, G, B components.

The Y, R-Y and B-Y component signal are low pass filtered by filters 16, 18 and 20 and converted to digital form by analog-to-digital (A/D) converters 22, 24 and 26 for storage in a memory 40. Filters 16-20 minimize aliasing and have cutoff frequencies of 7.5 MHz for Y and 2.8 MHz for the color difference signals R-Y and B-Y for the assumed PAL input signal. Lower cut off frequencies would be appropriate for NTSC standard signals.

Converters 22-26 digitize the low pass filtered components to an 8-bit resolution using a sample clock CL that is phase locked to a multiple of horizontal sync in order to obtain a constant number of samples per horizontal line. After A/D conversion the digitized components are applied to memory 40 via respective delay units 28, 30 and 32. The delay units may be variable and are included to equalize the delay times of the three input signal paths. The color difference components R-Y and B-Y are applied to memory 40 via a multiplex switch (MUX) 32 controlled by a horizontal line rate signal H. Switch 32 combines the two 8-bit wide color differences into a single 8-bit wide signal to minimizing storage requirements in memory 40.

As one field of the multiplexed 8-bit signal and the 8-bit luma signal are stored in memory 40, a field previously stored is read out twice using a read clock signal 2 CL of double the write clock CL frequency. This doubles the field rate (100 Hz for PAL, 120 Hz for NTSC) and so reduces the perception of flicker where the signal is displayed on display unit 60. A multiplex switch 42 demultiplexes the color difference signals which, with the double field rate luma signal, are converted back to analog form by digital to analog converters 44-48. Low pass filters 50-54 suppress the repeat spectra after D/A conversion, suitable cut-off frequencies being 13.5 MHz for luma and 6.75 MHz for chroma. The double field rate analog signals are then converted to R G B form for application to display 60 which is synchronized by means of "double speed" horizontal (2HS) and vertical (2VS) sweep signals provided by generators 62 and 64, respectively.

Timing signals for controlling the digital converters, memory, switches and scan generators are provided by timing unit 70 as discussed in detail subsequently. As will be explained, unit 70 generates two-field and four-field pulse sequences for memory control and scan generation selected to ensure that even fields overlay even fields, odd fields overlay odd fields and even and odd pairs of fields are interlaced when the double field rate signal is displayed.

Figure 2:
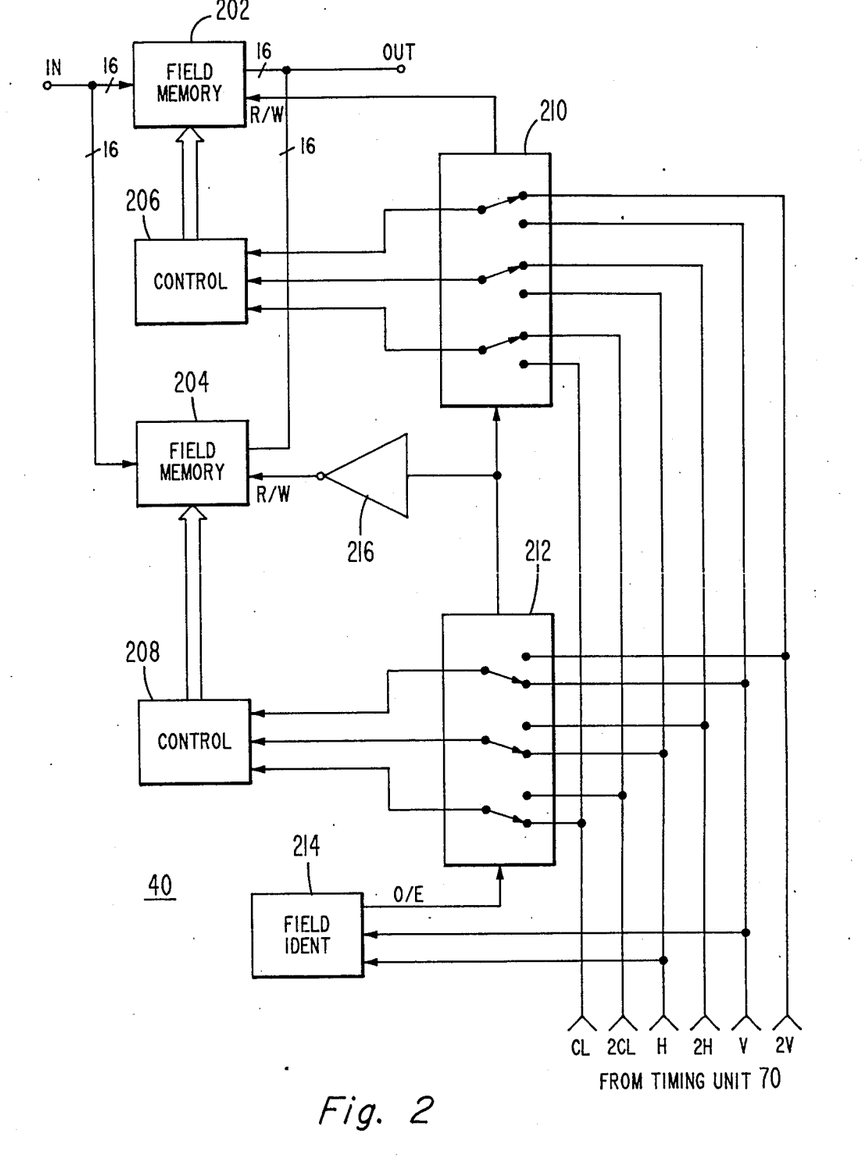
FIG. 2 is a block diagram illustrating details of memory organization used in the receiver of FIG. 1.

FIG. 2 provides details of the organization of memory 40. The memory comprises a pair of field memories 202 and 204 each having a control unit (206,208) coupled thereto for providing addresses and control pulses such that the memories operate as multiple line stores. Pixel addresses are generated by counting the clock signals CL or 2CL and line addresses are obtained by counting the line rate signals H or 2H. The vertical rate signal V or 2V is used to reset the addresses and thus initiate a read or write cycle. Selection of normal rate timing signals H,V, CL and the double rate timing signals 2H, 2V, 2CL for control units 206 and 208 is provided by switches 210 and 212. These switches are controlled by an odd-even (O/E) field identification signal produced by a field identification unit 214. The odd-even signal is also applied to the read/write control input of memory 202 and, via inverter 216, to the read/write input of memory 204.

Figure 4A:
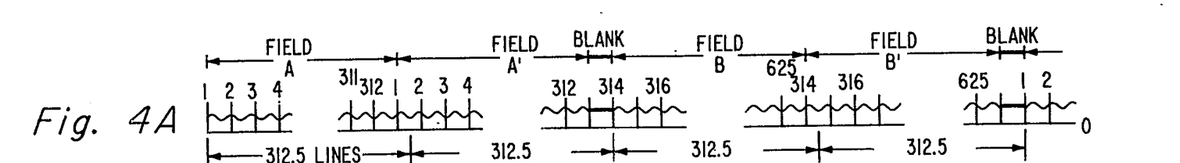
FIGS. 4A–4D are waveform diagrams illustrating operation of the receiver of FIG. 1.

In operation, as a field is being stored in one memory the field previously stored in the other memory is read out twice. The odd-even signal, obtained from horizontal and vertical sync by unit 214, selects which field memory is used for writing and which is used for reading. This signal (O/E) also controls the switches 210 and 212 which connect the normal rate signals CL, H and V to the storing memory and connect the double rate signals 2CL, 2H and 2V to the memory being read. At the beginning of each field the V signal selects the first line store in the writing memory. Each successive line being stored is selected by signal H and pixels are clocked in by clock signal CL. Reading out takes place in a similar manner. Signal 2CL clocks the stored pixels out of the memory. Signal 2V selects the first line of field to be read, that is, it initiates the read cycle. Signal 2H advances the line address for recovering the field. A field consists of 312.5 lines in the PAL standard. At double speed read out this field together with its repition must consist of 625 lines. Without upsetting the horizontal line rate, this can be realized when one of the two fields consists of 312 lines and the other consists of 313 lines. The memory 40 is supplied with timing signals from unit 70 to provide the field sequence shown in FIG. 4A in which 312 lines are produced in the first read cycle (fields A and B) and 313 lines are produced during the second memory read cycle (A' and B') with the 313th line being blank.

This field sequence 312-313-312-313 from memory 40 is obtained by decoding counts 0 to 3 and 312 to 315 in a divide-by-625 line counter in unit 70 which counts 2H pulses. The decoder output is supplied as the 2V read control signal to memory 40. Since the 2V signal initiates each read cycle in memory 40, as previously explained, and the decoder signal has a period of 312–313 lines that repeats on a two-field basis, the double rate video output signal will have the same number of lines and two-field repeating pattern and the last line of the second cycle will be blank. A blank line is produced because one more line is read from the memory than was stored. Alternatively, the memory may be paused for one line.

Figures 4B, 4C:
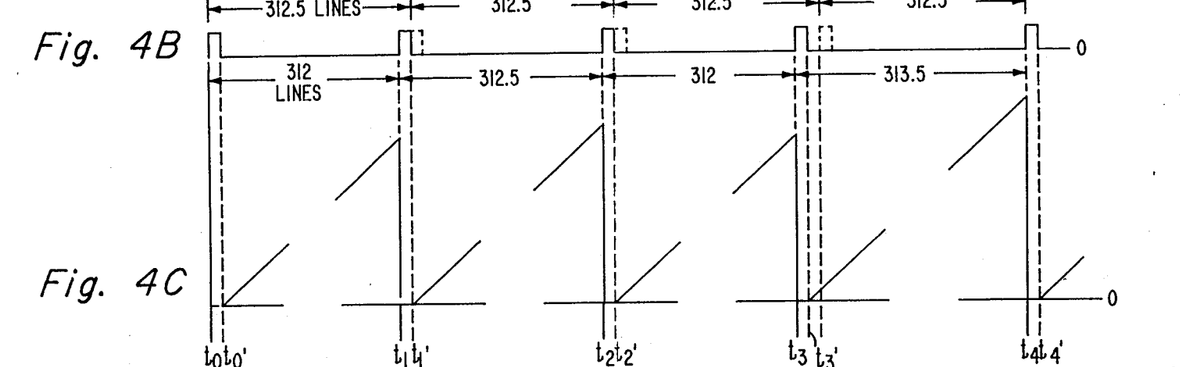
Figure 4D:
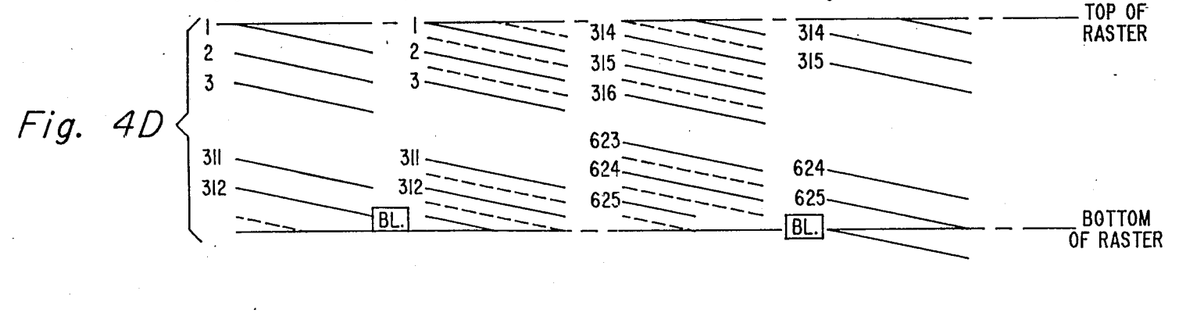

The double field rate vertical sync signal 2V' for generator 64 has a different pulse pattern than that used to initiate the memory read cycles. This is shown in FIG. 4B where the pulses in phantom represent "normal" (i.e., equidistant) double rate vertical sync pulses having a period of 312.5 line. The solid line represents signal 2V' which is periodic on a four-field basis. As shown, there are 312 lines in field A, 312.5 lines in the repeat field A', 312 lines in field B and 313.5 lines in repeat field B'. This signal (2V') synchronizes vertical scan generator 64 to produce the vertical scan waveforms shown in FIG. 4C which result in the interlace patterns shown in FIG. 4D in which the first fields (A, A') overlay first fields, the second fields overlay second field (B, B') and in which the first and second field pairs (AA', BB') are interlaced. For purpose of comparison, the dashed lines in FIG. 4D illustrate scan lines which would result if the 2V' sync pulses (FIG. 4B) were equidistant rather than being shifted. To ensure proper registration of displayed fields, the sawtooth voltage of FIG. 4C provided by generator 64 always starts at the same value and all retrace times (t0-t0', t1-t1', t2-t2', etc.) are equal. Generator 64 is described in detail subsequently.

Figure 3:
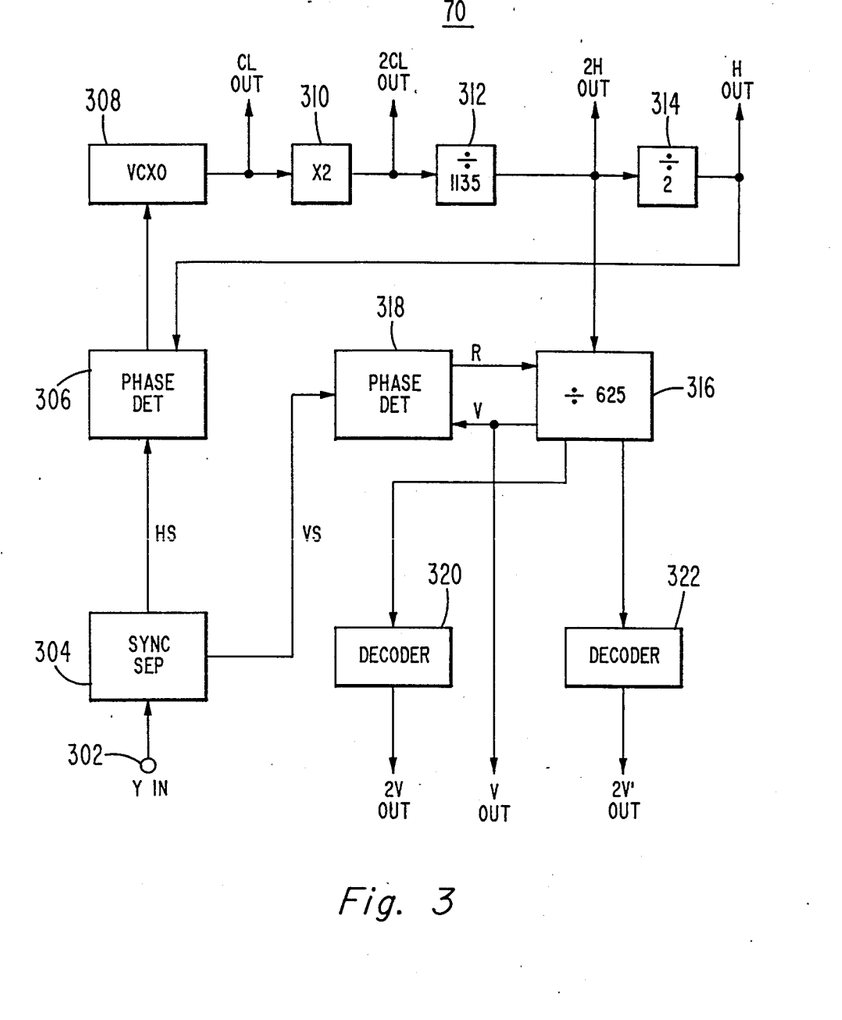
FIG. 3 is a block diagram illustrating details of a timing unit used in the receiver of FIG. 1.

FIG. 3 provides details of a suitable implementation of timing unit 70. The luma signal Y from processor 14 is applied to the input 302 of a sync separator 304. The horizontal sync (HS) output of separator 304 is applied to the phase detector 306 of a phase lock loop which includes a voltage controlled crystal oscillator (VCXO) 308, a frequency doubler (X2) 310, a divide-by-1135 divider 312, and a divide-by-two divider 314 connected in a loop. In operation of this portion of unit 70, when the loop (306–314) is in lock VCXO 308 will oscillate at a frequency of 1135 times the horizontal frequency (HS). This frequency (17.734375 MHz) is used as the clock signal CL for A/D converters 22–26 and as the pixel write clock for memory 40 and corresponds to four times the PAL subcarrier frequency without the 25 Hz offset so that the clock can be line synchronous. The double rate clock 2CL for D/A converters 44–48 and memory read operations is provided by doubler 310 which doubles the frequency of clock signal CL. Using a VCXO directly at the 2CL clock frequency is less satisfactory because at such a high frequency the control range of VCXO 308 may be relatively narrow. The use of a doubler for generating the 2 CL signal allows lower frequency operation of the VCXO and thus improves the control range. Signal 2CL is divided by 1135 in divider 312 to produce the double line rate signal 2H for MUX switch 42 and memory 40. Signal 2H, in turn is divided by two in divider 314 to produce the normal rate horizontal sync signal H which is compared in phase detector 306 with the phase of HS provided by sync separator 304 to provide the control voltage for the VCXO 308. The inclusion of all frequency changing elements (multipliers and dividers) within the loop 306–314 ensures a well defined frequency and phase relationship between signals CL, 2CL, H and 2H as compared with the alternative of using open loop (external) multipliers or divides.

The double line rate signal 2H of divider 312 is divided by 625 in divider 316 to produce the vertical sync signal V that initiates the write cycles of memory 40. Phase detector 318 compares signal V with the vertical sync signal VS produced by sync separator 304 and supplies a reset signal to divider 316 for synchronizing signal V with signal VS. The double field rate vertical signal 2V that initiates read cycles of memory 40 is provided by decoder 320 which decodes counts 0 to 3 and 312 to 315 of divide-by-625 divider 316. The period between pulses therefore alternates on a two field basis between 312 and 313 lines as in necessary for initiating the memory read cycles as previously explained. The double field rate signal 2V' for vertical scan generator 64 is provided by decoder 322 which decodes the output of divider 316 to provide the pulse sequence having a four field sequence of 312, 312.5, 312 and 313.5 line intervals (FIG. 4B). The half line intervals may be provided by delay elements in decoder 322 and a field counter can be used to select the correct decoded line count over the four field sequence. Alternatively, the 2H signal may be doubled and divided by 1250 to allow direct decoding over four fields.

Figure 5:
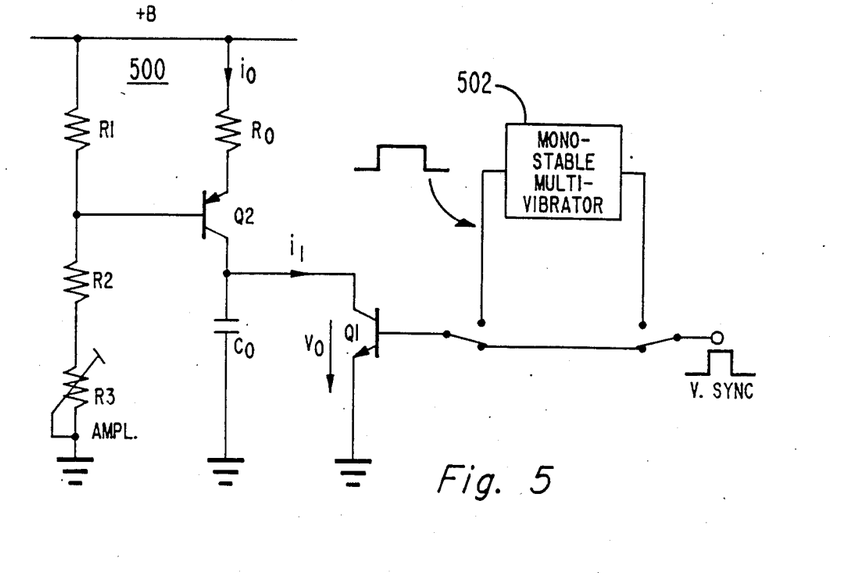
FIG. 5 is a simplified block diagram of a vertical scan generator suitable for use in the receiver of FIG. 1.
Figure 6:
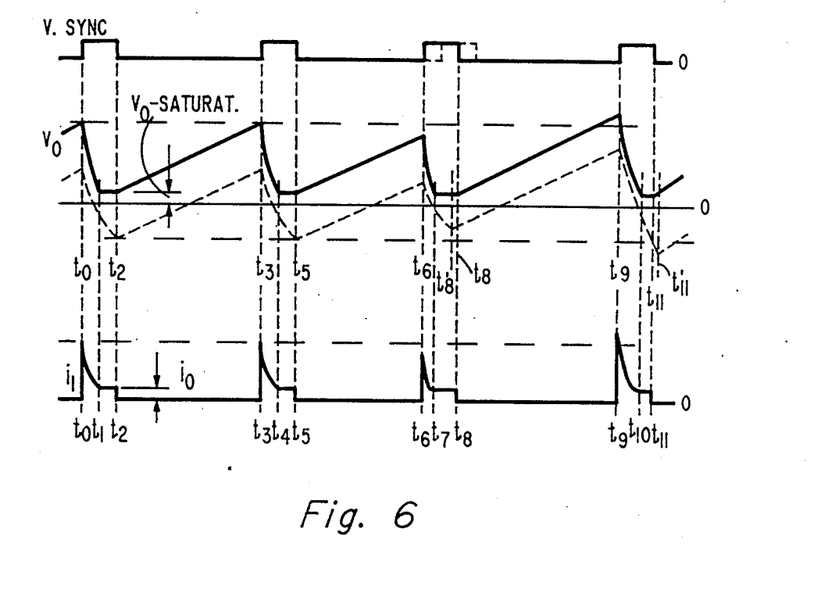
FIG. 6 is a waveform diagram illustrating operation of the scan generator of FIG. 5.

The irregularly spaced double field rate vertical sync pulses (2V') for scan generator 64 cause a slight variation in scan amplitude (FIG. 4C) which, in turn would tend to cause a variation in the retrace times over the four field sequence. In FIG. 6 the dashed sawtooth waveform shows the undefined raster position which would result if the retrace time of generator 64 was not controlled and if AC-coupling was used to the display vertical amplifier or modulator. The clamped sawtooth generator of FIG. 5 comprises a current source transistor Q2 biased by resistors R0, R1, R2 and R3 to supply current to sawtooth capacitor Co coupled in parallel with the conduction path of a transistor switch Q1. This generator produces the raster scan shown in solid lines in FIG. 6 with the proper offset from field to field. The vertical scan always starts at exactly the same position on the screen as controlled by the time shifted vertical sync pulses (2V').

In operation transistor Q1 conducts during the duration of the vertical sync pulse which may be applied directly to the Q1 base electrode (as shown) or conditioned by a monostable multivibrator 502. When Q1 is "ON" the sawtooth voltage (Vo, FIG. 6) is clamped to ground (plus the saturation voltage of Q1) and so the ramp starts from the same voltage in each field. Should the discharge time of capacitor Co exceed the width of the 2V' sync pulse, multivibrator 502 may be used to provide a wider pulse. It is apparent from FIG. 6 that clamping of the sawtooth generator by a pulse of constant width produces a constant retrace time in spite of the fact that the scan amplitudes vary slightly from field to field.

Figure 7:
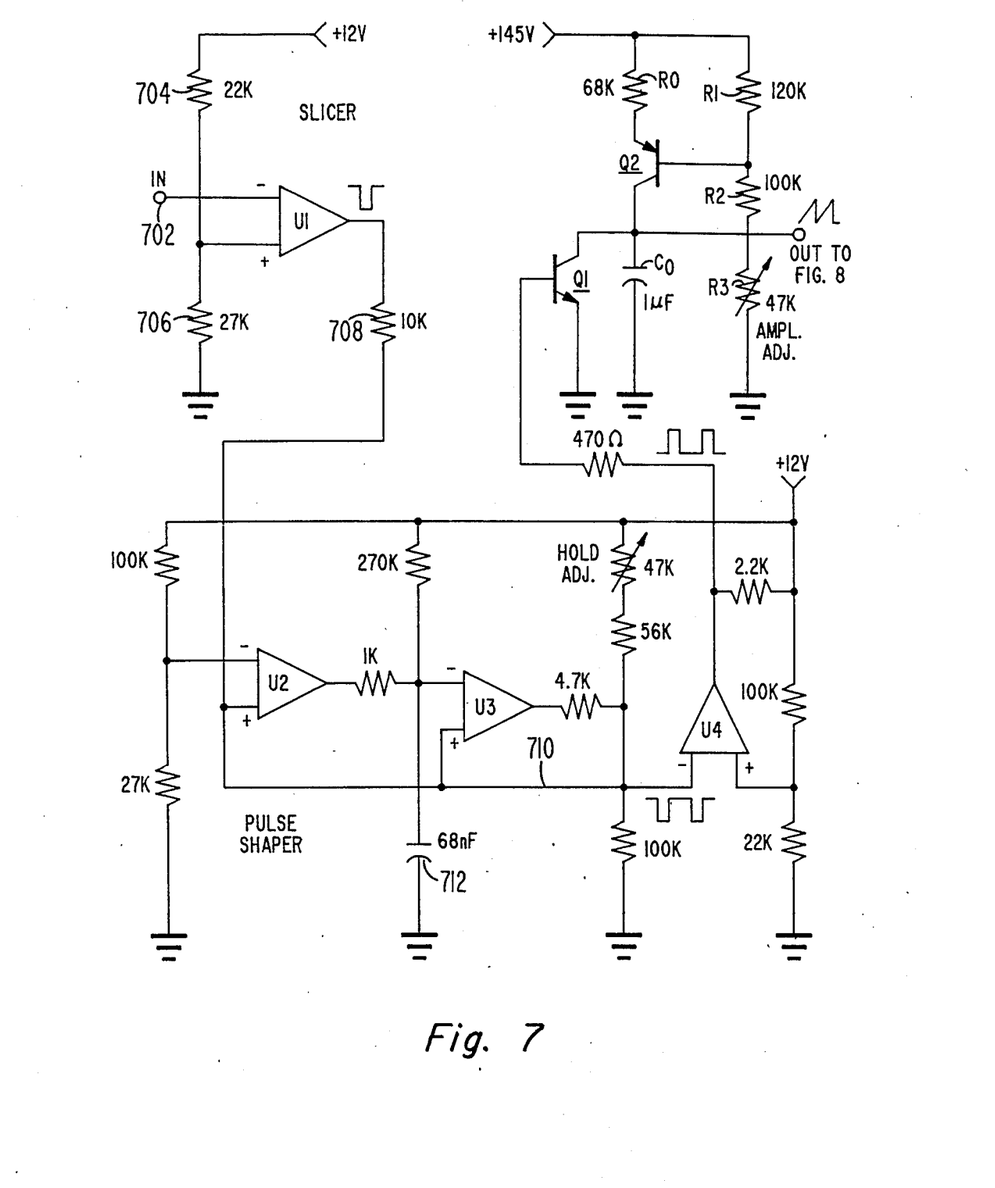
FIGS. 7 and 8 are detailed schematic circuit diagrams of a vertical scan generator suitable for use in the receiver of FIG. 1.
Figure 8:
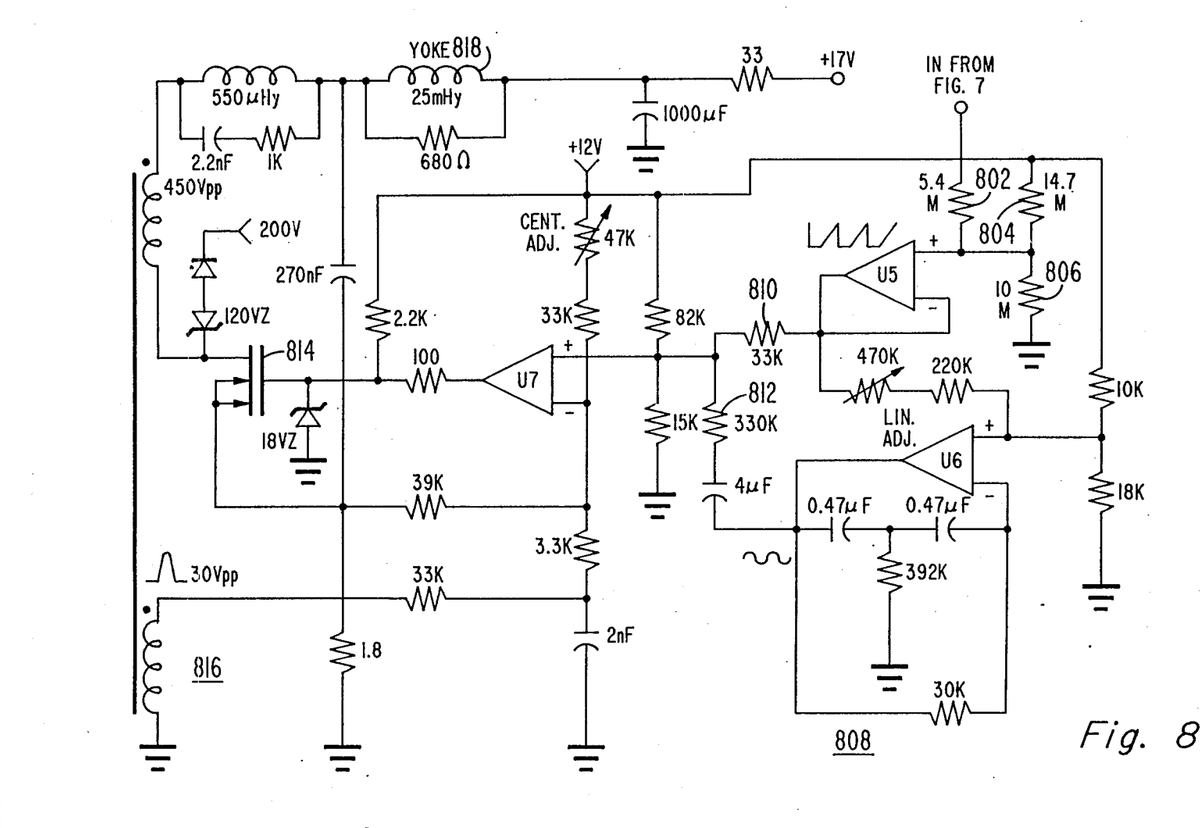

As previously mentioned, the DC component of the vertical sawtooth should be preserved and transmitted to the deflection yoke. DC coupling should be used between the sawtooth generator and the vertical amplifier (or modulator) as well as to the yoke coil. FIGS. 7 and 8 are detailed circuit diagram of a vertical scan generator having these features and having the constant retrace time (t0–t0', t1–T1' etc. of FIG. 4C) and the consistent reset level features important for achieving proper raster registration in the double field rate receiver of FIG. 1 which employs non-equidistant vertical sync pulses.

In FIG. 7 the sync pulse 2V' is applied to input 702 of a signal slicer comprising amplifier V1 based by resistors 704 and 706. Representative element values are shown for all components. The output of the slicer amplifier U1 is applied via resistor 708 to a pulse shaping circuit comprising amplifiers U2, U3 and V4 which generate a constant width reset pulse for triggering transistor Q1 of the ramp generator circuit 500 of FIG. 5. A hold control (variable 47K ohm resistor) in the pulse shaping circuit allows pulse width adjustment by varying the monostable period of the pulse "stretcher" formed by amplifier U2 and U3. Amplifier U4 inverts the conditioned pulses to provide the proper polarity drive signal for transistor Q1 of ramp generator 500.

In the vertical deflection circuit of FIG. 8 the ramp signal of FIG. 7 is DC biased by means of resistors 802–806 and buffered by amplifier U5. The output of amplifier U5 is applied to a linearity correction circuit (indicated generally as 808) which produces a smoothed linearity correction signal that is added to the ramp signal by means of resistors 810 and 812. Amplifier U7 applies the corrected sweep signal to the driver transistor 814 of the vertical output stage (indicated generally as 816). It will be noted from FIGS. 7 and 8 that DC coupling is used at every stage of the vertical processing from terminal 702 of the slicer of FIG. 7 to the yoke coil 818 in FIG. 8.

What is claimed is:

1. A television display system, comprising:

input means for receiving an interlaced video input signal having a given field rate;

memory means coupled to said input means, said memory means having a write cycle for storing a field of said input signal and having first and second read cycles for recovering a previously stored field two times during said write cycle for providing a video output signal of double said given field rate;

display means coupled to said memory means for displaying said double field rate video output signal; and timing means responsive to said video input signal for supplying a read control signal to said memory means for initiating said read cycles, said read control signal having a pulse waveform that repeats on a two-field basis, said timing means further supplying a vertical synchronizing signal to said display means having a pulse waveform that repeats on a four-field basis, each said pulse waveform having a nominal frequency of double said given field rate, said two-field and four-field pulse waveforms being selected to provide an image on said display means in which even fields overlay even fields, odd fields overlay odd fields and in which even and odd pairs of fields are interlaced.

2. A television display system as recited in claim 1 wherein said pulse waveform of said read control signal comprises pulses that are alternately spaced one-field minus one half-line apart and one field plus one-half line apart and wherein said pulse waveform of said vertical synchronizing signal comprises pulses having spacings therebetween which differ by multiples of one-half line from pulse-to-pulse such than no consecutive pair of pulses have the same spacing.

3. A television display system as recited in claim 1 wherein said memory means is responsive to said read control signal for providing said video output signal in which each field thereof includes a given number of active lines and in which every other field thereof also includes at least one blank line.

4. A television display system as recited in claim 1 further comprising scan generator means responsive to said vertical synchronizing signal for supplying a vertical scan signal to said display means of sawtooth form having a fixed starting point and a constant retrace time interval.

5. A television display system as recited in claim 1 wherein said video input signal is of PAL format, wherein said pulse waveform of said read control signal comprises pulses that are alternately spaced 312 and 313 lines apart and wherein said pulse waveform of said vertical synchronizing signal comprises consecutive pulses spaced apart by 312 lines, 312.5 lines, 312 lines and 313.5 lines in a repeating four-field sequence.

6. A television display system as recited in claim 1 wherein said timing means includes phase lock loop means responsive to a horizontal synchronizing component of said video input signal for providing a double line-rate output signal, divider means responsive to said double line rate output signal for providing a vertical rate output signal and phase detector means coupled to said counter means for synchronizing said vertical rate signal with a vertical synchronizing component of said video input means and decoder means coupled to said counter means for producing said double field rate pulse waveforms.

7. A division display apparatus as recited in claim 6 wherein said phase lock loop means includes controllable oscillator means having a given frequency control range and frequency multiplier means in said phase lock loop means for effectively increasing the control range of said controllable oscillator means.

8. A television display system, comprising:

input means for receiving an interlaced video input signal having a given field rate;

memory means coupled to said input means, said memory means having a write cycle for storing a field of said input signal and having first and second read cycles for recovering a previously stored field two times during said write cycle for providing a video output signal of double said given field rate;

display means coupled to said memory means for displaying said double field rate video output signal; and timing means responsive to said video input signal for supplying a read control signal to said memory means for initiating said read cycles, said read control signal having a pulse waveform that repeats on a two-field basis selected such that each recovered field comprises a given number of active lines and every other field also includes at least one blank line, said timing means further supplying a vertical synchronizing signal to said display means having a pulse waveform that repeats on a four-field basis with no two consecutive pulses have the same spacing therebetween, said two-field and four-field pulse waveforms being selected to provide an image on said display means in which even fields overlay even fields, odd fields overlay odd fields and in which even and odd pairs of fields are interlaced.

9. A television display system as recited in claim 8 wherein said pulse waveform of said read control signal comprises pulses that are alternately spaced one-field minus one half-line apart and one-field plus one-half line apart and wherein said pulse waveform of said vertical synchronizing signal comprises pulses having a spacing therebetween which differ by a multiple of one-half line from pulse to pulse.

10. A television display system as recited in claim 8 wherein said video input signal is of PAL format, wherein said pulse waveform of said read control signal comprises pulses that are alternately spaced 312 and 313 lines apart and wherein said pulse waveform of said vertical synchronizing signal comprises consecutive pulses spaced apart by 312 lines, 312.5 lines, 312 lines, and 313.5 lines in a repeating four-field sequence.

11. A television display system as recited in claim 8 further comprising scan generator means responsive to said vertical synchronizing signal for supplying a vertical scan signal via a direct current coupled path to said display means said vertical scan signal being of sawtooth form having a fixed starting point and a constant retrace time interval.

12. A television display system as recited in claim 8 wherein said timing means includes phase lock loop means responsive to a horizontal synchronizing component of said video input signal for providing a double line-rate output signal, divider means responsive to said double line rate output signal for providing a vertical rate output signal and phase detector means coupled to said counter means for synchronizing said vertical rate signal with a vertical synchronizing component of said video input means and decoder means coupled to said counter means for producing said double field rate pulse waveforms.

13. A television display apparatus as recited in claim 12 wherein said phase lock loop means includes controllable oscillator menas having a given frequency control range and frequency multiplier means in said phase lock loop means for effectively increasing the control range of said controllable oscillator means.

* * * * *